July 21, 1959

O. WITTEL 2,895,375

FILM PITCH COMPENSATING MECHANISM FOR PHOTOGRAPHIC APPARATUS

Filed Aug. 4, 1954

OTTO WITTEL
INVENTOR.

BY Daniel I. Mayne
Paul P. Holmes

ATTORNEYS

OTTO WITTEL
INVENTOR.

BY Daniel I. Mayer

Paul R. Holmes
ATTORNEYS

July 21, 1959 — O. WITTEL — 2,895,375
FILM PITCH COMPENSATING MECHANISM FOR PHOTOGRAPHIC APPARATUS
Filed Aug. 4, 1954 — 4 Sheets-Sheet 3

OTTO WITTEL
INVENTOR.
ATTORNEYS

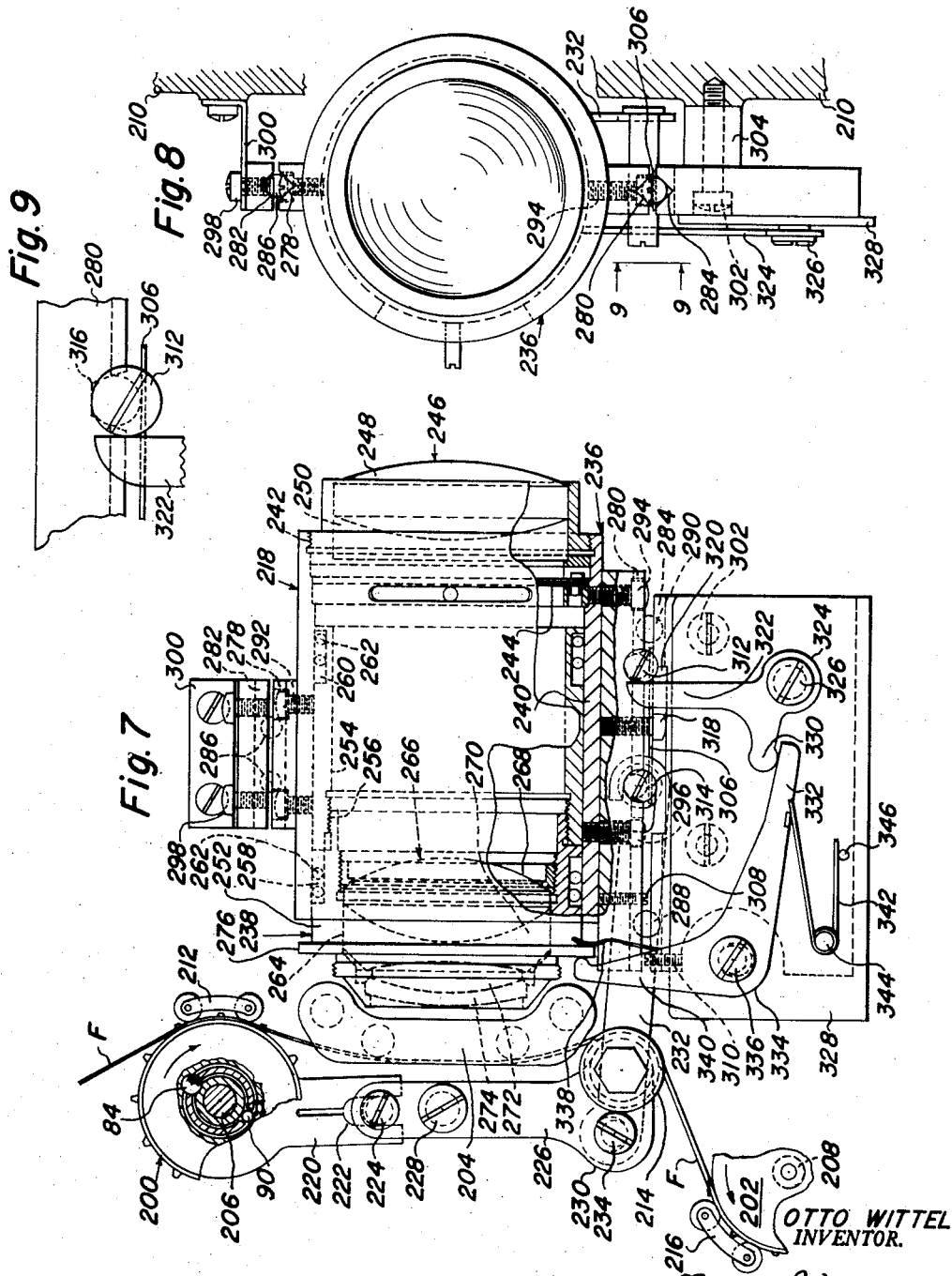

though a detailed description of my invention and its

United States Patent Office 2,895,375
Patented July 21, 1959

2,895,375

FILM PITCH COMPENSATING MECHANISM FOR PHOTOGRAPHIC APPARATUS

Otto Wittel, Rochester, N.Y., assignor to Eastman Kodak Company, Rochester, N.Y., a corporation of New Jersey Application August 4, 1954, Serial No. 447,862

7 Claims. (Cl. 88—17)

This invention relates to photographic apparatus and more particularly to an automatic film pitch compensatory sprocket and an automatic adjusting lens mount for use in motion picture projectors to maintain the projected images in a constant position, at the same magnification, and continuously in focus on the projection screen regardless of variations in film pitch due to shrinkage or stretch of the film strip.

As is well known in the photographic art a film strip may shrink or stretch depending on the conditions under which it is stored or used, with the result that variations occur from the normal or proper framing position of the film in the film gate and also that the projected image deviates from normal magnification and focus on the projection screen. These factors have become of increasing importance in the development of photographic projectors for use in conjunction with television where registration and focusing errors must be reduced to a minimum.

My invention hereinafter disclosed may be utilized in any suitable photographic apparatus, but is particularly adapted for use in a non-intermittent motion picture projector such as is disclosed in my copending United States application, Serial No. 303,230, filed August 8, 1952 which issued on February 5, 1957 as Patent No. 2,780,133. According to my present invention two spaced film strip driving sprockets, driven together in synchronism, are positioned on opposite sides of the film gate. One of the sprockets, the compensatory film driving sprocket, is provided with a peripheral drum means pivotally associated therewith for changing the driving radius of the sprocket with respect to the film strip. The drum means is actuated in accordance with the variations in pitch occurring in the film strip between the sprockets. The variations are determined by means of a measuring roller positioned in a loop of the film between the film gate and the other sprocket. Suitable means including a system of levers on one of which the roller is rotatably mounted, operatively connect the roller to the drum means. The lever system is also operatively connected to the movable projection lens system for simultaneously adjusting the magnification of the lens system in accordance with the variations in film pitch.

Though a detailed description of my invention and its operation follows, it will be apparent to those skilled in the art from the foregoing brief summary that many of the disadvantages of the prior art photographic projection apparatus have been eliminated.

The primary object of the present invention, therefore, is to provide in a photographic apparatus a variable film pitch compensating mechanism in which the driving radius of the compensatory film driving sprocket and the magnification of the projection lens system are simultaneously and automatically adjusted in accordance with variations in pitch occurring in the film strip.

Another object is to provide in a photographic apparatus a variable film pitch compensating mechanism for varying the driving radius of the compensatory film driving sprocket in accordance with variations in pitch occurring in the film strip to thereby prevent damage to the film strip perforations occurring from improper registration with the sprocket teeth.

Still another object is to provide in a photographic apparatus a variable film pitch compensating mechanism for adjusting the magnification of the projection lens system in accordance with variations in pitch occurring in the film strip to thereby maintain the projected image area constant in size and position on the projection screen.

Yet another object is to provide a variable film pitch compensatory sprocket for advancing a film strip through a photographic apparatus.

Other objects and advantages will become apparent to those skilled in the art from the following description with reference to the drawings wherein like reference characters denote like parts and wherein:

Fig. 7 is a plan view partly in section illustrating the preferred embodiment of the variable film pitch compensating mechanism according to my invention;

Fig. 8 is an end view of the preferred embodiment illustrated in Fig. 7; and

Fig. 9 is an enlarged plan view of the eccentric pin and channel member construction of Fig. 8 taken along line 9—9.

Figure 1:
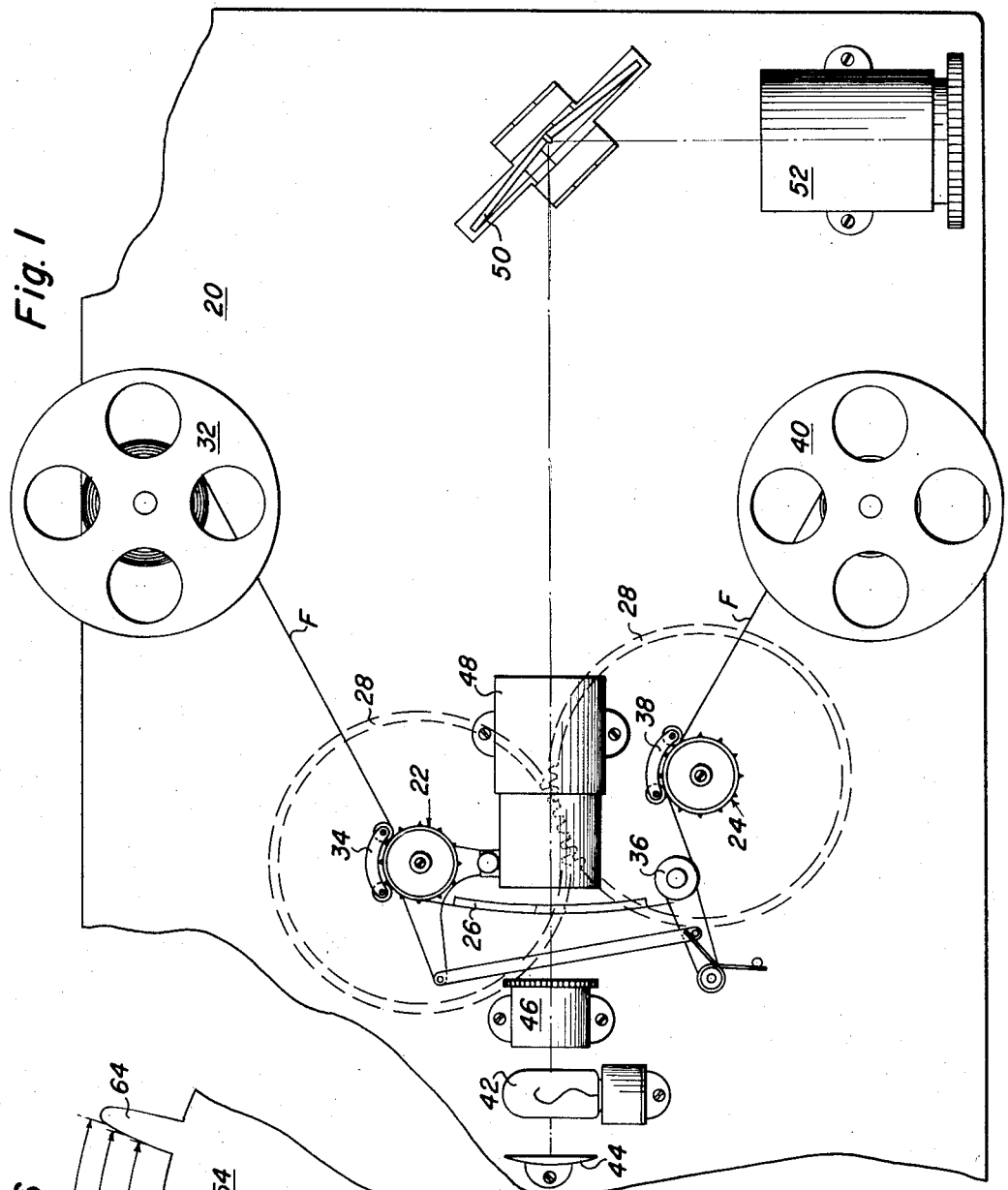
Fig. 1 is a plan view of a motion picture projection apparatus illustrating one embodiment of my invention.

Fig. 1 illustrates one embodiment of my invention mounted in a non-intermittent motion picture projector, wherein 20 designates the projector mounting wall on which the various parts are assembled. A compensatory film driving sprocket 22 and driving sprocket 24 are mounted in spaced relation on opposite sides of the film gate 26. Sprockets 22 and 24 are rotated together in synchronism by a motor (not shown) through meshing gears 28 positioned on the reverse side of wall 20. The film strip F from supply reel 32 passes over sprocket 22 under shoe 34, through film gate 26, and around measuring roller 36 over sprocket 24 under shoe 38, and onto take up reel 40. Light from a light source or lamp 42 which is preferably reinforced by a reflector 44 is transmitted by the condenser system 46 through gate 26 and the projection lens system 48. The light is then reflected from the continuously rotating split mirror 50, through the supplemental projection lens system 52 and to the projection screen (not shown) on which the film images are to be focused. The specific operation and structure of the rotating mirror 50 forms no part of the present invention, but is fully disclosed in my aforementioned copending United States application. Suffice it to state that the rotating mirror 50 constitutes a means for directing images received from the non-intermittently moving film strip F onto a suitable projection screen.

Figure 2:
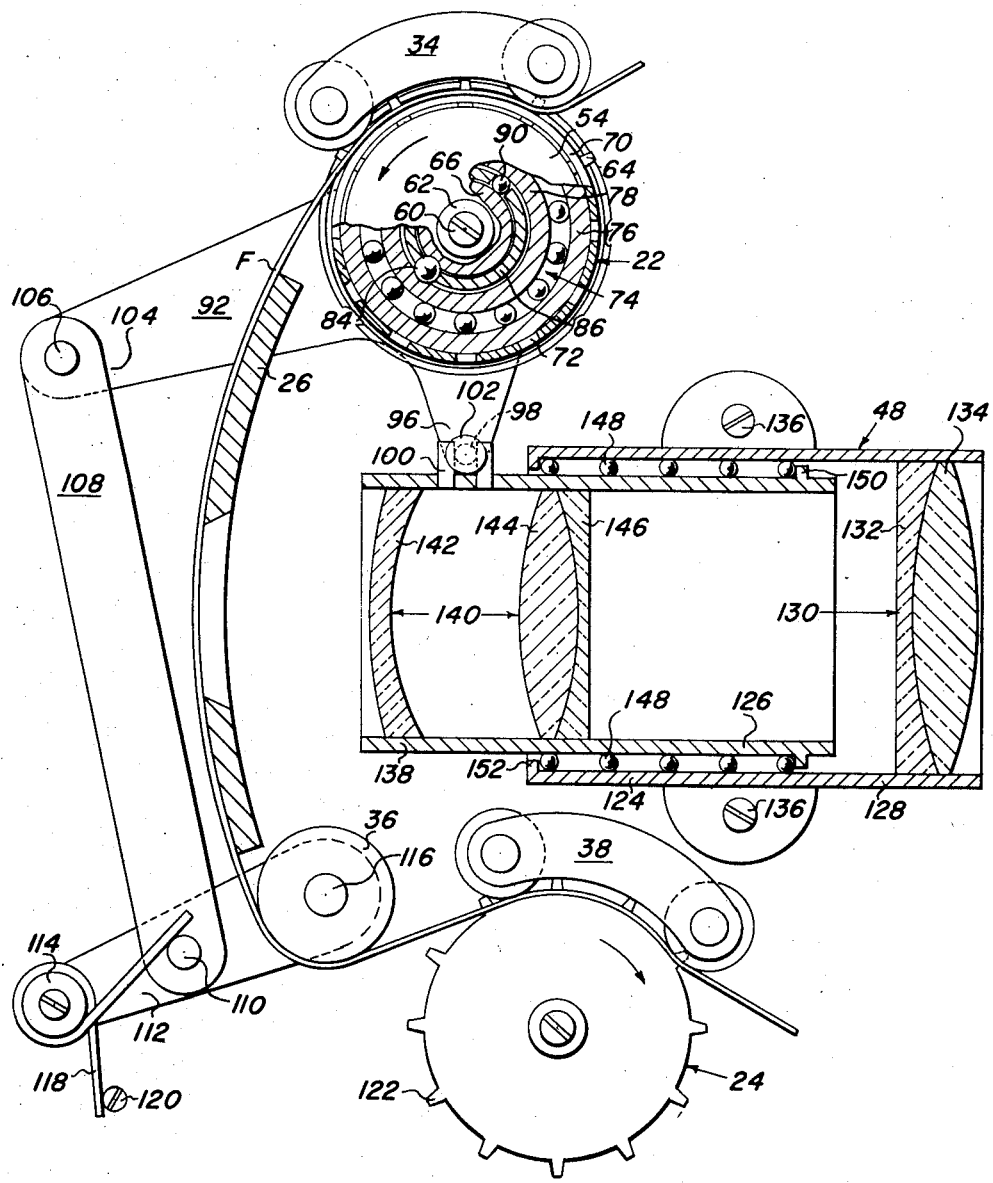
Fig. 2 is an enlarged plan view partly in section of the variable film pitch compensating mechanism illustrated in Fig. 1.
Figure 3:
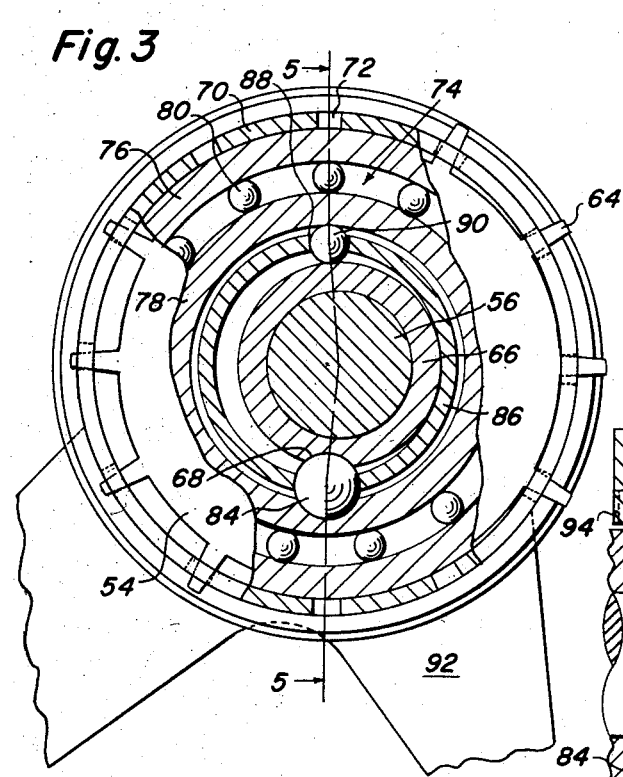
Fig. 3 and Fig. 4 are enlarged plan views partly in section of the variable film pitch compensatory sprocket of my invention.
Figure 5:
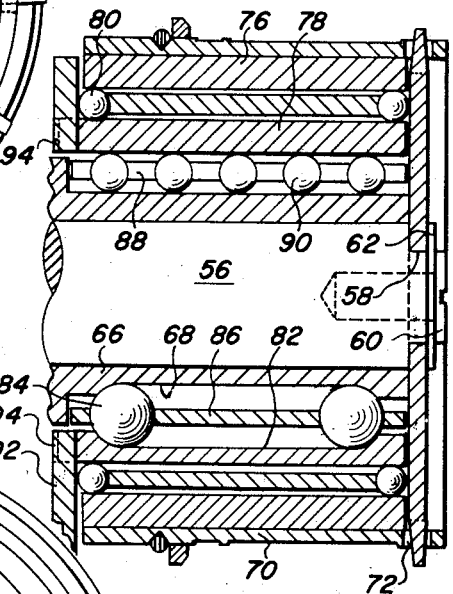
Fig. 5 is a cross-sectional view of the variable film pitch compensatory sprocket taken along line 5—5 of Fig. 3.
Figure 4:
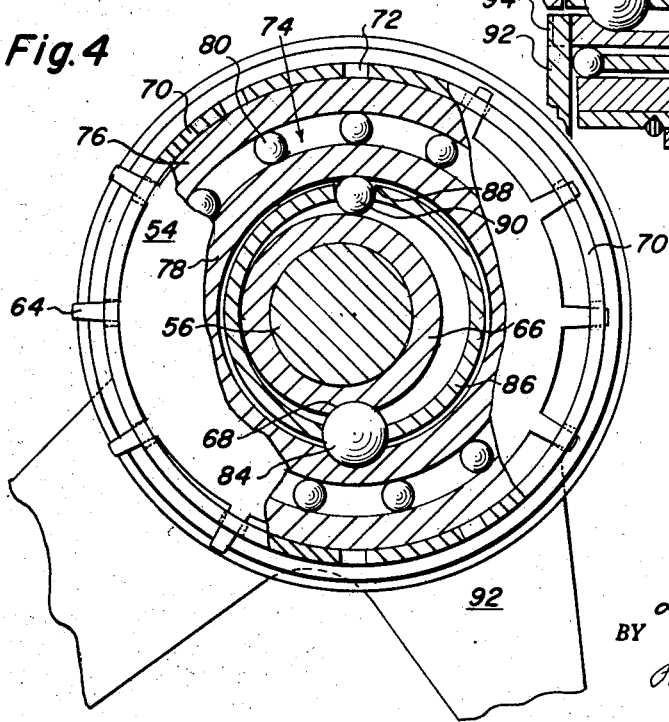

The details of my invention will be readily understood by those skilled in the art when described with reference to Figs. 2 3, 4, 5, and 6. In Fig. 2 the gate 26 and lens system 48 are shown in cross-section and the compensatory sprocket 22 in partial cross-section in order to facilitate comprehension of the description which follows. Fig. 3 and Fig. 4 are further enlarged views in partial cross-section of compensatory sprocket 22. Sprocket 22 comprises a disk 54 rigidly secured on sprocket shaft 56 by means of non-circular end 58, bolt 60 and washer 62. Shaft 56 carries one gear 28 on the reverse side of the projector wall. Disk 54 is provided with relatively long driving teeth 64 for engaging the perforations in a film strip. The main sprocket bearing 66 for shaft 56 is stationary and provided with a longitudinal groove or slot 68. Drum 70 has an inside diameter slightly larger than the diameter of disk 54 and an outside diameter substantially less than the peripheral diameter of teeth 64. The teeth 64 of disk 54 extend through a series of apertures 72 which are equally spaced around the periphery of drum 70, it being understood that drum 70 may be conveniently made in two sections to permit assembly on the disk 54 over teeth 64. As is best illustrated in Fig. 5 ball bearing mount 74 comprises an outer race 76 fastened to the inside cylindrical wall of drum 70, an inner race 78 and bearing balls 80. Race 78 is provided with a longitudinal groove or slot 82 which is positioned in spaced opposed relation to slot 68 to thereby establish a channel for receiving a series of pivot balls 84, which are held in position by a split retainer ring 86. Between the ends of the ring 86 at the point 88 of the split, a series of bearing balls 90 are positioned to engage bearing 66 and race 78 and thereby permit pivotal movement of race 78 about balls 90. It will be appreciated by those skilled in the art that pivot pins or roller bearings could be utilized in place of balls 80, 84, and/or 90.

Control lever 92 is rigidly mounted on inner race 78 by splines 94 with sufficient clearance from shaft 56 and bearing 66 to allow the lever 92, bearing mount 74 and drum 70 to pivot with respect to shaft 56. One end 96 of lever 92 extends below sprocket 22 and is provided with a pin 98 which engages between two upstanding lugs 100 on lens system 48. An enlarged head 102 on pin 98 stops the lugs 100 from rotating off of the pin 98. The other end 104 of lever 92 is pivotally connected at 106 to lever link 108 which is in turn pivotally connected at 110 to floating lever 112. Lever 112 is pivotally mounted on stud 114 to the mounting wall 20 and carries roller 36 rotatably mounted on a short shaft 116 fixed on the end of lever 112 opposite stud 114. A spring 118 engaging the pivotal connection at 110 and a stop 120 on the mounting wall 20 biases roller 36 to maintain a constant tension on the film strip F. Sprocket 24 having teeth 122 for engaging the film strip perforations and driving the film strip at a constant effective radius is conventional and may be of any convenient design well known to those skilled in the art. The teeth on sprockets 22 and 24 are so arranged that only one tooth on each is in instantaneous driving engagement with the film strip perforations.

Lens system 48 comprises a stationary cell 124 and a movable cell 126. Cell 124 includes barrel member 128 in which lens unit 130 comprising elements 132 and 134 is mounted. Member 128 is fastened to mounting wall 20 by screws 136. Cell 126 includes cylindrical member 138 in which lens unit 140 comprising elements 142, 144 and 146 is mounted. Cell 126 is free to move axially with respect to cell 124 within barrel member 128 on bearings 148. Suitable flanges 150 and 152 retain bearings 148 in operative relation between the cells. The lugs 100 are attached to cell 126 in any convenient manner; however, care must be exercised to ensure sufficient height to accommodate the extremes of movement of pin 98 resulting from maximum shrinkage or stretch in film strip F.

When a film strip F of exact normal pitch is being driven through film gate 26 by sprockets 22 and 24, as illustrated in Fig. 2, roller 36 occupies a "normal position" in the film strip path between gate 26 and sprocket 24 applying a normal tension to the film strip. "Normal position" as used in the specification and claims denotes the relative position of the parts under the condition when a normal pitch film strip is passing through the film gate and between sprockets 22 and 24. Since roller 36 occupies its normal position, drum 70 occupies its normal position, which is concentric and slightly spaced relative to disk 54, supporting the film strip at a normal effective driving radius on the instantaneous driving tooth of sprocket 22, and cell 126 occupying a normal position with respect to cell 124. Thus a normal distance is provided between the tooth on sprocket 22 which is in instantaneous driving engagement with the film strip and the tooth on sprocket 24 which is simultaneously in instantaneous driving engagement with the film strip. With roller 36 in such normal position, normal magnification and proper focus of lens system 48 for the image frames on the film strip results. Furthermore, the distance between successive film driving teeth 64 on sprocket 22 is equal to the pitch of the normal film strip. Effective driving radius as used in the specification and claims means the radius at which an instantaneously driving tooth engages the perforation of the film strip being driven by the sprocket.

For purposes of explanation assume a portion of film strip F having greater than normal pitch, i.e. the distance between successive perforations or image frames is greater than the normal distance due to stretch of the film strip, arrives at a position between the tooth of sprocket 22 which is in instantaneous driving engagement with film strip F and the tooth on sprocket 24 which is simultaneously in instantaneous driving engagement with the film strip F. Since the total length of the film strip F between the instantaneously driving teeth is increased by an amount equal to the stretch of the film strip F between the instantaneous driving teeth, the roller 36 on lever 112 is pivoted clockwise a proportionate distance by the bias of spring 118 about stud 114. This pivotal movement is transmitted by link 108 to lever 92 thereby causing ring 86, bearing mount 74 and drum 70 to pivot in a counterclockwise direction with respect to shaft 56 about balls 84 as is illustrated in Fig. 3. With drum 70 in this position the effective driving radius is increased which increases the distance along the film strip path between the instantaneous driving teeth on sprockets 22 and 24. Increasing the effective driving radius, increases the distance between the successive driving teeth of sprocket 22, thereby permitting perfect registration of the successive driving teeth with the perforations of the stretched film strip F.

Figure 6:
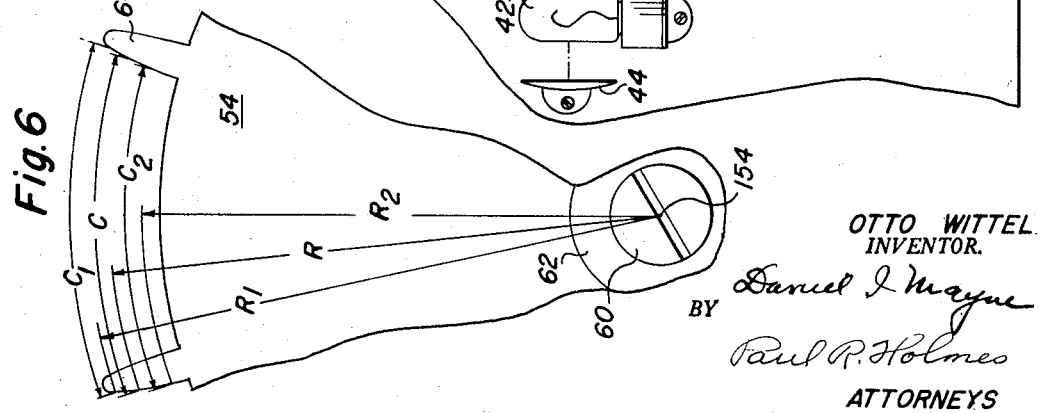
Fig. 6 is an enlarged plan view of successive driving teeth on the compensatory film driving sprocket of my invention.

These results will be clearly understood by reference to Fig. 6 in which two successive driving teeth of sprocket 22 have been illustrated. 154 represents the center of rotation of sprocket 22. With normal pitch film strip, the drum 70 supports the film strip at the normal effective driving radius R and the distance between successive driving teeth at radius R is C which is exactly equal to the pitch of the normal pitch film strip i.e., equal to the distance between leading edges of successive perforations of the film strip. With stretched film strip, the drum 70 supports the film strip at effective driving radius $R_1$ and the distance between successive driving teeth at radius $R_1$ is $C_1$ which is exactly equal to the pitch of the stretched film strip. With shrunken film strip as will hereinafter be described, drum 70 supports the film strip at effective driving radius $R_2$ and the distance between successive driving teeth at radius $R_2$ is $C_2$ which is exactly equal to the pitch of the shrunk film strip. The pivotal movement of lever 92 is also transmitted to cell 126 which is moved closer to cell 124 thereby decreasing the magnification of lens system 48 by an amount such that the size of the image received by mirror 50 is exactly the same as the size received by the mirror 50 when normal pitch film strip images are transmitted by cells 124 and 126 when in their normal positions. It will be appreciated by those skilled in the art that the lenses of cells 124 and 126 must be selected to have a depth of field sufficient to accommodate the extremes of movement of the cells caused by stretched or shrunk film strip without destroying the projected image focus.

Since now the action of the variable film pitch compensating mechanism has been described for the condition of stretched film strip, the description which follows relating to the action of the mechanism for the condition of film strip having less than normal pitch will be readily understood. When a portion of film strip F having less than normal pitch due to shrinkage of the film strip, arrives at a position between the instantaneously driving teeth of sprockets 22 and 24, the total length of film strip F between the instantaneously driving teeth is reduced by an amount equal to the shrinkage of the film strip between the instantaneously driving teeth. This reduced length causes roller 36 on lever 112 to be pivoted counterclockwise a proportionate distance against the bias of spring 118 about stud 114. This pivotal movement is transmitted by link 108 to lever 92 thereby causing lever 92, ring 86, bearing mount 74, and drum 70 to pivot in a clockwise direction with respect to shaft 56 about balls 84, as is illustrated in Fig. 4. With drum 70 in this position the effective driving radius is reduced, which reduces the distance along the film strip path between the instantaneous driving teeth on sprockets 22 and 24. Since the effective driving radius is reduced, the distance between the successive driving teeth 64 of sprocket 22 is reduced thereby compensating for the shorter distance between perforations on the less than normal pitch film strip F, and therefore preventing the perforations from being damaged or torn. The pivotal movement of lever 92 is also transmitted to cell 126 which is moved further away from cell 124 thereby increasing the magnification of lens system 48 by an amount such that the size of the image received by mirror 50 is exactly the same as the size of the image received by the mirror 50 when normal pitch film strip images are transmitted by cells 124 and 126 when in their normal positions.

Having now described one embodiment of my invention the description which follows of the preferred embodiment illustrated in Fig. 7 will be readily understood by those skilled in the art.

The preferred embodiment is adapted for use in a non-intermittent projector similar to the one disclosed in Fig. 1 utilizing a continuously rotating split mirror. Certain changes are necessary, however, for use of the illustrated projector with my preferred embodiment. These changes are the relocating of supply reel 32, sprockets 22, and 24 and take-up reel 40 to the left of the film gate 26 rather than to the right of the gate 26 as shown in Fig. 1. Referring to Fig. 7 a compensatory film driving sprocket 200 and driving sprocket 202 are mounted on opposite sides of the film gate 204 on spaced parallel shafts 206 and 208 respectively. Sprockets 200 and 202 are rotated together synchronously by a motor (not shown) through meshing gears (not shown) on the reverse side of the projector mounting wall 210. Film strip F from the supply reel (not shown) passes over sprocket 200 under shoe 212, through film gate 204, around measuring roller 214, over sprocket 202, over shoe 216, and onto the take up reel (not shown). Light from a reinforced light source passes through a condenser system such as illustrated in Fig. 1, through gate 204 and the projection lens system 218. The light is then reflected from a continuously rotating split mirror through supplemental projection lenses and to a projection screen as was illustrated and described with reference to Fig. 1.

Compensatory sprocket 200 is identical in structure to sprocket 22 previously described except for the mounting position with respect to the film gate. Since the direction of rotation of sprocket 200 of my preferred embodiment is opposite to the direction utilized in the embodiment of Fig. 1, it is required that the positions of pivot balls 84 and balls 90, as illustrated in Fig. 7, be reversed from the positions of identical parts 84 and 90 shown in Figs. 2, 3, 4 and 5. It has been found that for best results, the compensatory sprocket, pivot balls 84 and balls 90, should occupy positions relative to each other such that the plane which passes through the point at which the film strip leaves the compensatory sprocket tangent to the drum and which contains the axis of rotation of the compensatory sprocket shaft, should be substantially perpendicular to the plane which passes through the centers of pivot balls 84 and balls 90. Control lever 220 is rigidly mounted on inner race 78 in the same way as described in reference to lever 92 of Figs. 1 and 5. The other end of lever 220 is provided with an elongate slot 222 which engages an eccentric pin 224 carried on the upper end of a floating lever 226. Floating lever 226 is pivotally mounted on projector mounting wall 210 on a stud 228 and carriers measuring roller 214 on the distal end 230 thereof. A lever link 232 is pivotally connected to lever 226 at end 230 by an eccentric pin 234 and transmits movements for film pitch compensation to the lens system 218, as is hereinafter more fully described.

Lens system 218 comprises a first movable cell 236 and a second movable cell 238. Cell 236 includes a barrel member 240 provided with a stepped and threaded end portion 242 for receiving the shutter unit 244 and lens unit 246 comprising elements 248 and 250. Cell 238 is inserted in the other end of barrel 240 and includes a cylindrical member 252 threadedly joined to inner cylindrical member 254 at 256. Annular recesses 258 and 260 in cylindrical members 252 and 254, respectively, receive suitable bearings 262 to permit telescopic movements of the cylindrical and barrel members 252, 254, and 240. Cylindrical member 252 is provided with a stepped and threaded end portion 264 for receiving lens unit 266 comprising elements 268, 270, 272, and 274. The outer end portion of cylindrical member 252 is provided with an annular flange 276 for reasons which will hereinafter be explained. V channel members 278 and 280 located diametrically opposite each other on barrel member 240 and V channel members 282 and 284 opposed to members 278 and 280 respectively form a track in which bearings 286, 288, and 290 are positioned to enable cell 236 to be readily moved axially with respect to the fixed film gate 204. Member 278 is secured to barrel 240 by means of bolts 292, and member 280 is similarly secured to barrel 240 by bolts 294 and 296. Member 282 is supported through bolts 298 on bracket 300 from wall 210. Bolts 292 and 298 retain bearings 286 within the channel members 278 and 282. Member 284 is secured in position by means of bolts 302 which are countersunk in member 284, pass through a spacer 304 and into the mounting wall 210 as shown in Fig. 8. Bearing 290 is retained between bolts 294 and the end of a retainer plate 306. Set screws 308 and 310 located in members 280 and 284 respectively as shown in Fig. 7 retain bearing 288 in the track between the members. Two eccentric adjustment pins 312 and 314 are located in trapezoidal slots 316 provided in member 280. Fig. 9 an enlarged view of a portion of member 290 and pin 312 illustrates this construction. Retainer plate 306 firmly holds the reduced eccentric portion of pins 312 and 314 in slot 316 by means of bolt 318 which passes through the plate 306 and into member 280. A rectangular slot 320 is provided in the upper surface of member 284 to accommodate the projecting head portion of bolt 318. Pin 312 is engaged by arm 322 of bell crank lever 324 which is pivotally mounted on stud 326 over face plate 328. Arm 330 of lever 324 is contacted by arm 332 of adjustable bell crank lever 334 which is pivotally mounted on an eccentric pin 336. A leaf spring 338 is fastened to the edge of arm 340 of lever 334 and maintains arm 340 in contact with the outer surface of flange 276. A spring 342 mounted on a stud 344 and bearing against a stop 346, biases levers 324 and 334 to their normal positions with normal film strip between sprockets 200 and 202.

Eccentric pins 224, 234, 312, 314, and 336 are provided in order that the projection lens system 218 and compensatory sprocket 200 can be initially adjusted to the correct normal position when normal pitch film strip is passing through gate 204 between sprockets 200 and 202.

For purposes of explanation assume a portion of film strip F having less than normal pitch arrives at a position between the tooth on sprocket 200 which is in instantaneous driving engagement with the film strip F and the tooth on sprocket 202 which is simultaneously in instantaneous driving engagement with the film strip F. Since the total length of the film strip F between the instantaneous driving teeth is decreased by an amount equal to the shrinkage of the film strip between the instantaneous driving teeth, roller 214 on lever 226 is pivoted clockwise along with end 230 of lever 226 about stud 228 and against the bias of spring 342 acting through bell crank levers 324 and 334, pin 312, member 280, pin 314, and floating lever 226. This movement is transmitted through pin 224 in slot 222 to lever 220 causing lever 220 and drum 70 to pivot in a counterclockwise direction with respect to compensatory sprocket shaft 206. The effective driving radius of sprocket 200 is therefore decreased which decreases the distance along the film strip path between the instantaneous driving teeth of sprockets 200 and 202, and decreases the distance between the successive driving teeth of sprocket 200 permitting perfect registration with the perforations of the shrunken film strip as was explained in regard to my first embodiment and Fig. 3. The pivotal movement of lever 226 is also transmitted through lever 232 to pin 314, causing pin 314, member 280, barrel 240, and cell 236 to be shifted to the left along the track formed by the V channel members 278, 280, 282, and 284 illustrated in Fig. 6. Member 280 carries with it pin 312 causing bell crank lever 324 to pivot counterclockwise about stud 326. This movement is transmitted to the bell crank lever 334 causing it to pivot in a clockwise direction about pin 336 against the bias of spring 342. The clockwise movement of lever 334 is transmitted through arm 340 to the cell 238 through annular flange 276 causing cell 238 to be shifted to the right within barrel 240 on bearings 262. The combined movements of cells 236 and 238 increase the magnification of projection lens system 218 by an amount such that the size of the image received by the rotating split mirror (not illustrated in this embodiment), is exactly the same as the size received by said mirror when normal pitch film strip images are transmitted by cells 236 and 238 when in their normal positions.

In the case of film strip having greater than normal pitch due to a stretched film strip arriving at a position between the instantaneous driving teeth of sprockets 200 and 202, the roller 214 is pivoted counterclockwise along with end 230 of lever 226 about stud 228 by the biasing force exerted by spring 342 through bell crank levers 324 and 334, pin 312, channel member 280, pin 314, and lever 232. This pivotal movement is transmitted by pin 224 to lever 220, causing lever 220 and drum 70 to pivot in a clockwise direction with respect to compensatory sprocket shaft 206. The effective driving radius of sprocket 200 is therefore increased which increases the distance between the instantaneous driving teeth of sprockets 200 and 202 a distance equal to the increased film strip length due to the stretch of the film strip F and increases the distance between successive driving teeth of sprocket 200 as described with respect to Fig. 6. Movement of roller 214 to the right as seen in Fig. 7 allows the spring 342 acting through bell crank levers 324 and 334, pin 312, and channel member 280 to shift barrel 240 together with cell 236 to the right along the track between channel members 278, 280, 282, and 284. Simultaneously cell 238 is shifted to the left, in a direction away from cell 236 by the biasing force of springs 338 and 342 acting on the inner surface of annular flange 276. These movements of the cells 236 and 238 decrease the magnification of lens system 218 by an amount such that the image received by the rotating split mirror (not illustrated in this embodiment) is exactly the same size as that received by said mirror when normal pitch film strip images are transmitted by cells 236 and 238 when in their normal operating positions.

It will now be appreciated by those skilled in the art that my invention eliminates the possibility of damage occurring to perforations of shrunk or stretched film strip resulting from improper registration of the perforations and the film driving teeth, and at the same time maintains the image projected by the projection lens system constant in size and position on the projection screen, as well as in focus regardless of the stretched or shrunk condition of the film strip.

Although I have illustrated only two embodiments of my invention many modifications are possible and will become apparent to those skilled in the art from the foregoing disclosure and therefore it is intended to be illustrative only and the scope of the invention is defined in the appended claims.

Having now particularly described my invention what I desire to secure by Letters Patent of the United States and what I claim is:

1. In photographic apparatus the combination with a film gate and synchronously driven rotatable driving members each mounted on a driving shaft and positioned opposite the entrance and exit sides of said gate for engaging a film strip and for advancing said film strip through said gate, of a variable film pitch compensating device associated with one of said driving members and comprising fixed bearing means nonrotatably mounted in said apparatus and supporting said one driving member and its shaft for rotation about a fixed rotational axis, a cylindrical drum peripherally disposed about said one driving member and rotatably driven thereby, second bearing means concentric with said drum for rotatably mounting said drum on said fixed bearing means, said second bearing means being pivotally mounted on said fixed bearing means for movement independently of the rotation of said drum, between a first position concentric with said fixed bearing means and a second position eccentric with said fixed bearing means, said drum in said first position of said second bearing means supporting a film strip having a normal film pitch on said one driving member at a normal driving radius and in said second position of said second bearing means supporting a film strip having a film pitch which is different from said normal film pitch on said one driving member at a driving radius different from said normal driving radius, and means for sensing variations in pitch of said film strip being advanced through said gate, said sensing means comprising contact means in engagement with said film strip beneath said driving members and movable by said strip in response to variations in pitch of the film strip between said driving members, and means for imparting the movements of said contact means to said second bearing means to position said second bearing means in one of said positions in accordance with the pitch of said film strip.

2. In photographic apparatus the combination with a film gate and synchronously driven rotatable driving members each mounted on a driving shaft and having film driving portions for engaging a film strip, said driving members being positioned opposite the entrance and exit sides of said gate for advancing said film strip through said gate, of a variable film pitch compensating device associated with one of said driving members and comprising fixed bearing means nonrotatably mounted in said apparatus and supporting said one driving member and its shaft for rotation about a fixed rotational axis, a cylindrical drum having a series of apertures spaced around the periphery thereof for receiving said portions of said one driving member, said drum being peripherally disposed around said one driving member with said portions extending through said apertures and rotatably driving said drum, second bearing means concentric with said drum for mounting said drum on said fixed bearing means for rotation with said one driving member, said second bearing means being mounted on said fixed bearing means for pivotal movement independently of the rotation of said drum, between a first position concentric with said fixed bearing means and a second position eccentric with said fixed bearing means, said drum in said first position of said second bearing means supporting a film strip having a normal film pitch on said portions of said one driving member at a normal driving radius and in said second position of said second bearing means supporting a film strip having a pitch which is different from said normal film pitch on said portions of said one driving member at a driving radius differing from said normal driving radius, and means for sensing variations in pitch of said film strip being advanced through said gate, said sensing means comprising contact means in engagement with said film strip between said driving members and movable by said strip in response to variations in pitch of the film strip between said driving members, and means for imparting the movements of said contact means to said second bearing means to position said second bearing means in one of said positions in accordance with the pitch of said film strip.

3. In photographic apparatus the combination with a film gate and synchronously driven rotatable driving members each mounted on a driving shaft and having relatively elongate teeth for engaging a perforated film strip, said driving members being positioned opposite the entrance and exit sides of said gate for advancing said film strip through said gate, of a variable film pitch compensating device associated with one of said driving members and comprising fixed bearing means nonrotatably mounted in said apparatus and carrying said one driving member and its shaft for rotation about a fixed rotational axis, a cylindrical drum having a series of apertures spaced around the periphery thereof for receiving the teeth of said one driving member, said drum being peripherally disposed around said one driving member with said teeth extending through said apertures radially outwardly from said periphery of said drum and rotatably driving said drum, second bearing means concentric with said drum for rotatably mounting said drum on said fixed bearing means, said second bearing means being pivotally mounted on said fixed bearing means for movement independently of the rotation of said drum, between a first position concentric with said fixed bearing means and a second position eccentric with said fixed bearing means, said drum in said first position of said second bearing means supporting a film strip having a normal film pitch on said teeth of said one driving member at a normal driving radius and in said second position of said second bearing means supporting a film strip having a film pitch which is different from said normal film pitch on said teeth of said one driving member at a driving radius differing from said normal driving radius, and means for sensing variations in pitch of said film strip being advanced through said gate, said sensing means comprising a control lever system including a roller in contact with the film strip between said driving members and movable by said strip in response to variations in film pitch of the film strip between said driving members, said control lever system being operatively connected to said second bearing means to position said second bearing means in one of said positions in accordance with the pitch of said film strip.

4. For use in a photographic apparatus, a variable film pitch compensatory device comprising a rotatable driving member mounted on a driving shaft and having film driving portions for engaging and advancing a film strip, stationary bearing means supporting said driving member and said shaft for rotation about a fixed rotational axis and adapted to be nonrotatably mounted in said apparatus, a drum rotatably driven by said driving member and disposed around the periphery of said driving member with said portions extending radially outwardly beyond the periphery of said drum, second bearing means concentric with said drum for rotatably mounting said drum on said stationary bearing means, said second bearing means being pivotally mounted on said stationary bearing means for movement independently of the rotation of said drum, between a first position concentric with said stationary bearing means and a second position eccentric with said stationary bearing means, said drum in said first position of said second bearing means supporting a film strip having a normal film pitch on said portions of said driving member at a normal driving radius and in said second position of said second bearing means supporting a film strip having a film pitch which is different from said normal film pitch on said portions at a driving radius which is different from said normal driving radius, means for sensing variations in pitch of the film strip being advanced by said device and including contact means for engaging the film strip and mounted for movement by said strip in response to variations in pitch of the film strip, and means for imparting the movements of said contact means to said second bearing means to position said second bearing means in one of said positions in accordance with the pitch of said film strip.

5. For use in photographic apparatus, a variable film pitch compensatory device comprising a rotatable driving member mounted on a driving shaft and having relatively elongate teeth for engaging and advancing a perforated film strip, stationary bearing means carrying said one driving member and said shaft for rotation about a fixed rotational axis and adapted to be nonrotatably mounted in said apparatus, a cylindrical drum having a series of apertures spaced around the periphery thereof, said drum being disposed around the periphery of said driving member with said teeth extending through said apertures radially outwardly beyond the periphery of said drum and rotatably driving said drum, second bearing means concentric with said drum for rotatably mounting said drum on said stationary bearing means, said second bearing means being pivotally mounted on said stationary bearing means for movement independently of the rotation of said drum, between a first position concentric with said stationary bearing means and a second position eccentric with said stationary bearing means, said drum in said first position of said second bearing means supporting a film strip having a normal film pitch on said teeth at a normal driving radius and in said second position of said second bearing means supporting a film strip having a film pitch which is different from said normal film pitch on said teeth at a radius differing from said normal driving radius, means for sensing variations in pitch of the film strip being advanced by said device and including a roller for engaging the film strip and mounted for movement by said strip in response to variations in pitch of the film strip, and means for imparting the movements of said roller to said second bearing means to position said second bearing means in one of said positions in accordance with the pitch of said film strip.

6. A compensatory film strip advancing mechanism for photographic apparatus comprising a rotatable driving member mounted on a driving shaft and provided with portions for engaging and advancing a film strip, fixed bearing means supporting said shaft for rotation with said driving member about a fixed rotational axis and adapted to be nonrotatably mounted in said apparatus, a cylindrical drum disposed about the periphery of said driving member and rotatably driven thereby, second bearing means concentric with said drum for rotatably mounting said drum on said fixed bearing means, said second bearing means being mounted on said fixed bearing means for pivotal movement independently of the rotation of said drum between a first position concentric with said fixed bearing means and a second position eccentric with said fixed bearing means, said drum in said first position of said second bearing means supporting a film strip having a normal film pitch on said portions at a normal driving radius and in said second position of said second bearing means supporting a film strip having a film pitch which is different from said normal film pitch on said portions at a radius differing from said normal driving radius, and means for selectively positioning said second bearing means in one of said positions in accordance with the pitch of the film strip to be advanced by said driving member.

7. A compensatory film strip advancing mechanism for photographic apparatus comprising a rotatable driving member mounted on a driving shaft and provided with relatively elongate teeth for engaging and advancing a perforated film strip, fixed bearing means carrying said shaft for rotation with said driving member about a fixed rotational axis and adapted to be nonrotatably mounted in said apparatus, a cylindrical drum having a series of apertures spaced around the periphery thereof, said drum being disposed about the periphery of said driving member with said teeth extending through said apertures radially outwardly beyond the periphery of said drum and rotatably driving said drum, second bearing means concentric with said drum for rotatably mounting said drum on said fixed bearing means, said second bearing means being pivotally mounted on said fixed bearing means for movement independently of the rotation of said drum between a first position concentric with said fixed bearing means and a second position eccentric with said fixed bearing means, said drum in said first position of said second bearing means supporting a film strip having a normal film pitch on said teeth at a normal driving radius and in said second position of said second bearing means supporting a film strip having a film pitch which is different from said normal film pitch on said teeth at a driving radius differing from said normal driving radius, and means for selectively positioning said second bearing means in one of said positions in accordance with the pitch of the film strip to be advanced by said driving member.

References Cited in the file of this patent

UNITED STATES PATENTS

| | | |
|---|---|---|
| 1,139,731 | Schustek | May 18, 1915 |
| 1,613,730 | Steigman | Jan. 11, 1927 |
| 1,713,663 | Kosken | May 21, 1929 |
| 1,873,778 | Mechau | Aug. 23, 1932 |
| 1,882,014 | Howell | Oct. 11, 1932 |
| 1,972,676 | Bolza | Sept. 4, 1934 |
| 2,013,350 | Leventhal | Sept. 3, 1935 |
| 2,132,003 | Holst | Oct. 4, 1938 |
| 2,168,433 | Parvopassu | Aug. 8, 1939 |
| 2,227,054 | Bedford | Dec. 31, 1940 |
| 2,487,870 | Harrison | Nov. 15, 1949 |
| 2,513,084 | Fairbanks | June 27, 1950 |
| 2,601,790 | Magnuson | July 1, 1952 |

UNITED STATES PATENT OFFICE

CERTIFICATE OF CORRECTION

Patent No. 2,895,375                                    July 21, 1959

Otto Wittel

It is hereby certified that error appears in the printed specification of the above numbered patent requiring correction and that the said Letters Patent should read as corrected below.

Column 8, line 64, claim 1, for "beneath" read -- between --.

Signed and sealed this 1st day of March 1960.

(SEAL)
Attest:

KARL H. AXLINE                                    ROBERT C. WATSON
Attesting Officer                                   Commissioner of Patents